United States Patent
Maady et al.

(10) Patent No.: US 11,964,567 B2
(45) Date of Patent: Apr. 23, 2024

(54) OPEN-LOOP VEHICLE PROPULSION CONTROL

(71) Applicant: GM GLOBAL TECHNOLOGY OPERATIONS LLC, Detroit, MI (US)

(72) Inventors: Rashad K. Maady, Ypsilanti, MI (US); Krunal P. Patel, South Lyon, MI (US); Matthew Yard, Milford, MI (US); Kristopher D. Lang, Fort Collins, CO (US)

(73) Assignee: GM Global Technology Operations LLC, Detroit, MI (US)

( * ) Notice: Subject to any disclaimer, the term of this patent is extended or adjusted under 35 U.S.C. 154(b) by 767 days.

(21) Appl. No.: 17/152,077

(22) Filed: Jan. 19, 2021

(65) Prior Publication Data
US 2022/0227239 A1  Jul. 21, 2022

(51) Int. Cl.
*B60L 15/20* (2006.01)
*B60L 58/14* (2019.01)

(52) U.S. Cl.
CPC ............. *B60L 15/20* (2013.01); *B60L 58/14* (2019.02); *B60L 2220/42* (2013.01); *B60L 2240/423* (2013.01); *B60L 2240/54* (2013.01)

(58) Field of Classification Search
CPC ...... B60L 15/20; B60L 58/14; B60L 2220/42; B60L 2240/423; B60L 2240/54
USPC .......................................................... 701/22
See application file for complete search history.

(56) References Cited

U.S. PATENT DOCUMENTS

| | | | |
|---|---|---|---|
| 11,285,950 B1* | 3/2022 | Bolger | B60W 30/18118 |
| 2009/0267555 A1* | 10/2009 | Schulz | H02P 29/50 318/432 |
| 2023/0327592 A1* | 10/2023 | Kojima | H02P 21/18 318/400.02 |

FOREIGN PATENT DOCUMENTS

| | | | | |
|---|---|---|---|---|
| JP | 2009106069 | * | 5/2009 | H02P 6/10 |
| WO | WO-0032462 A1 | * | 6/2000 | B60K 17/043 |

OTHER PUBLICATIONS

Machine translation of Takeda et al. JP2009106069 (Year: 2009).*

* cited by examiner

*Primary Examiner* — Jacob S. Scott
*Assistant Examiner* — Michael E Butler
(74) *Attorney, Agent, or Firm* — Quinn IP Law

(57) ABSTRACT

A propulsion control system has an electric motor configured to generate an axle torque in response to a final torque command, and has a motor constraint that specifies a maximum torque. A motor controller is configured to generate the final torque command in response to an intermediate torque command and a distributed power limit command. An open-loop function in supervisory controller is configured to calculate an initial torque command vector in response to a driver torque command, calculate an intended operating vector by mapping the initial torque command vector into a multidimensional power space, generate the intermediate torque command by clipping the intended operating vector in response to the motor constraint, generate a constrained command vector by clipping the intended operating vector in response to the motor constraint and a plurality of energy storage constraints, and generate the distributed power limit command in response to the constrained command vector.

20 Claims, 6 Drawing Sheets

OPEN-LOOP VEHICLE PROPULSION CONTROL

INTRODUCTION

The present disclosure relates to a system and a method for open-loop vehicle propulsion control.

Electric motors in modern electric vehicles are capable of generating large torque values. Under some circumstances, the high torque values may be sufficient to damage propulsion system and drive train components in the electric vehicles. Closed-loop control systems that consider multiple component constraints simultaneously typically iterate through multiple calculations to optimize the controls. The multiple iterations may cause response lags in the propulsion systems that may be sensed by drivers of the electric vehicles.

What is desired is a technique for open-loop vehicle propulsion control.

SUMMARY

A propulsion control system is provided herein. The propulsion control system includes an electric motor, a motor controller, and a supervisory controller. The electric motor is configured to generate an axle torque in response to a final torque command. The axle torque is transferrable to a drive wheel. The electric motor has a motor constraint that specifies a maximum torque for proper operation of the electric motor. The motor controller is coupled to the electric motor, and is configured to generate the final torque command in response to an intermediate torque command and a distributed power limit command. The supervisory controller is coupled to the motor controller. The supervisory controller has an open-loop control function configured to calculate an initial torque command vector in response to a driver torque command, calculate an intended operating vector in a multidimensional power space by a polynomial mapping of the initial torque command vector into the multidimensional power space, generate the intermediate torque command by clipping the intended operating vector in response to the motor constraint, generate a constrained command vector by clipping the intended operating vector in response to the motor constraint and a plurality of energy storage constraints, and generate the distributed power limit command in response to the constrained command vector.

In one or more embodiments, the propulsion control system includes an energy storage device configured to provide electrical power to the motor controller. The energy storage device has the plurality of energy storage constraints that specifies a plurality of electrical limits for proper operation of the energy storage device.

In one or more embodiments of the propulsion control system, the clipping protects a plurality of propulsion hardware devices from damage due to the driver torque command, the propulsion hardware devices have a plurality of device constraints, and the plurality of device constraints includes the motor constraint and the plurality of energy storage constraints.

In one or more embodiments of the propulsion control system, one or more of the plurality of device constraints is a nonlinear constraint.

In one or more embodiments of the propulsion control system, one or more of the plurality of device constraints is a linear constraint.

In one or more embodiments of the propulsion control system, the supervisory controller is configured to prioritize the plurality of device constraints.

In one or more embodiments of the propulsion control system, a lowest priority device constraint is considered first in the open-loop control function, and a highest priority device constraint is considered last in the open-loop control function.

In one or more embodiments of the propulsion control system, the supervisory controller is configured to generate the multidimensional power space as a three-dimensional power space based on a plurality of limitations of the energy storage device.

In one or more embodiments of the propulsion control system, the electric motor, the motor controller, and the supervisory controller form part of a vehicle.

A method for controlling propulsion in a vehicle is provided herein. The method includes calculating an initial torque command vector with a supervisory controller using an open-loop control function in response to a driver torque command, calculating an intended operating vector in a multidimensional power space by a polynomial mapping of the initial torque command vector into the multidimensional power space, and generate an intermediate torque command by clipping the intended operating vector in response to a motor constraint. The motor constraint specifies a maximum torque for proper operation of an electric motor. The method further includes generating a constrained command vector by clipping the intended operating vector in response to the motor constraint and a plurality of energy storage constraints. The plurality of energy storage constraints specifies a plurality of electrical limits for proper operation of an energy storage device. The method includes generating a distributed power limit command in response to the constrained command vector, generating a final torque command with a motor controller in response to the intermediate torque command and the distributed power limit command, and generating an axle torque with the electric motor in response to the final torque command. The axle torque is transferrable to a drive wheel of the vehicle.

In one or more embodiments of the method, the clipping protects a plurality of propulsion hardware devices from damage due to the driver torque command, the propulsion hardware devices have a plurality of device constraints, and the plurality of device constraints includes the motor constraint and the plurality of energy storage constraints.

In one or more embodiments of the method, one or more of the plurality of device constraints is a nonlinear constraint.

In one or more embodiments, the method includes prioritizing the plurality of device constraints.

In one or more embodiments of the method, a lowest priority device constraint is considered first in calculating the open-loop control function, and a highest priority device constraint is considered last in the open-loop control function.

In one or more embodiments, the method includes generating the multidimensional power space as a three-dimensional power space based on a plurality of limitations of the energy storage device.

In one or more embodiments, the method includes adjusting the intermediate torque command in response to the intermediate torque command exceeding the motor constraint. The adjustment causes the electric motor to operate within the motor constraint.

A propulsion control system is provided herein. The propulsion system includes a plurality of electric motors, a plurality of motor controllers, an energy storage device, and a supervisory controller. The plurality of electric motors is configured to generate a plurality of axle torques in response to a plurality of final torque commands. The plurality of axle torques is transferrable to a plurality of drive wheels. Each of the plurality of electric motors has a motor constraint that specifies a maximum torque for proper operation of a corresponding one of the plurality of electric motors. The plurality of motor controllers is coupled to the plurality of electric motors, and configured to generate the plurality of final torque commands in response to a plurality of intermediate torque commands and a plurality of distributed power limit commands. The energy storage device is configured to provide electrical power to the plurality of motor controllers. The energy storage device has the plurality of energy storage constraints that specifies a plurality of electrical limits for proper operation of the energy storage device. The supervisory controller is coupled to the energy storage device and the plurality of motor controllers. The supervisory controller has an open-loop control function configured to calculate an initial torque command vector in response to a driver torque command, calculate an intended operating vector in a multidimensional power space by a polynomial mapping of the initial torque command vector into the multidimensional power space, prioritize the plurality of motor constraints and the plurality of energy storage constraints, generate a plurality of the intermediate torque commands by clipping the intended operating vector in response to the plurality of motor constraints as prioritized, generate a plurality of constrained command vectors by clipping the intended operating vector in response to the plurality of motor constraints and a plurality of energy storage constraints as prioritized, and generate the plurality of distributed power limit commands in response to the constrained command vector.

In one or more embodiments of the propulsion control system, supervisory controller is configured to adjust the plurality of intermediate torque commands in response to a particular one of the plurality of intermediate torque commands for a particular one of the plurality of motors exceeding a corresponding one of the plurality of motor constraints. The adjustment causes the particular electric motor to operate within the corresponding motor constraint.

In one or more embodiments of the propulsion control system, a computational throughput of the supervisory controller reduces in response to one or more of the plurality of electric motors being commanded to generate zero torque or one or more of the plurality of motor controllers being switched off.

In one or more embodiments of the propulsion control system, the plurality of electric motors is implemented in a vehicle, and ranges from two electric motors to eight electric motors.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure generally provide an open-loop propulsion control system that utilizes an N-dimensional geometric vector space (e.g., a multidimensional power space) to ensure hardware constraints are adhered to during steady state and transient maneuvers of vehicles. The adherence is accomplished by mapping an initial driver torque command into an intended operating vector and subsequently comparing the intended operating vector to prioritized hardware constraints in the N-dimensional geometric vector space. Implementations of the disclosure employ analytical geometry and similar triangle techniques. The resulting system and/or method are expandable to consider a number of linear constraints and/or nonlinear constraints.

Using the intended operating vector (or intended operating point) from an upstream supervisory control, the technique constrains propulsion torque commands based on multiple coupled and decoupled actuator (e.g., electric motor) constraints and multiple power source (e.g., energy storage device or battery pack) constraints while preserving a direction of the initial driver torque command in the N-dimensional geometric vector space. The supervisory control generally provides an open-loop torque control and power control to meet vehicle propulsion dynamics and constraints.

Figure 1:
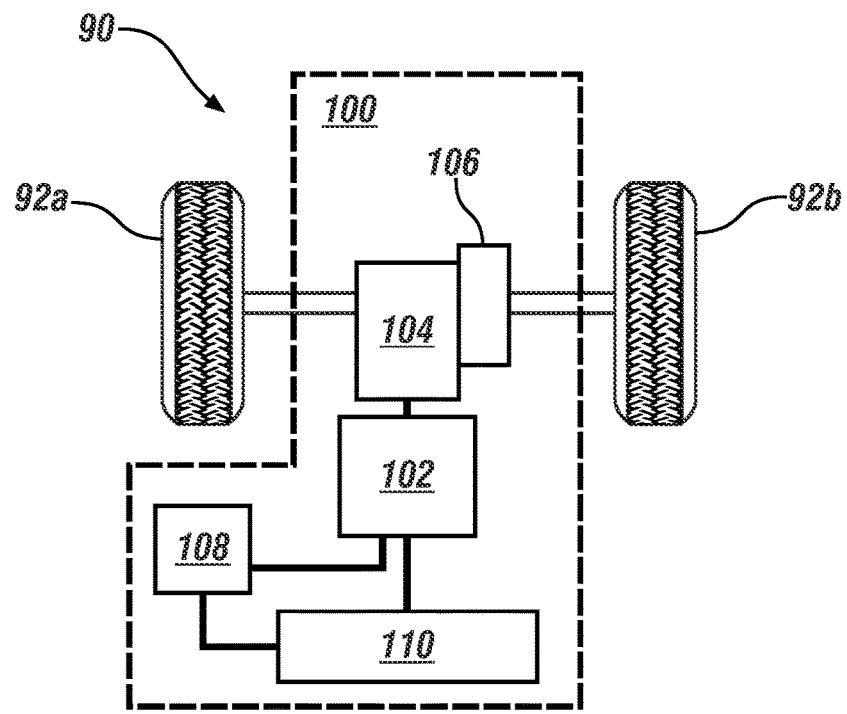
FIG. 1 is a schematic plan diagram illustrating a context of a vehicle in accordance with one or more exemplary embodiments.

Referring to FIG. 1, a schematic plan diagram illustrating a context of a vehicle 90 is shown in accordance with one or more exemplary embodiments. The vehicle 90 includes multiple drive wheels 92a-92b and a propulsion control system 100. The propulsion control system 100 includes a motor controller 102, an electric motor 104, multiple hardware devices 106, a supervisory controller 108, and an energy storage device 110.

The vehicle 90 may be implemented as an automobile (or car). In various embodiments, the vehicle 90 may include, but is not limited to, a passenger vehicle, a truck, an autonomous vehicle, an electric-powered vehicle, a hybrid vehicle, a motorcycle, or a train. Other types of vehicles 90 may be implemented to meet the design criteria of a particular application.

The drive wheels 92a-92b implement road wheels. The drive wheels 92a-92b are generally operational to provide for support and movement of the vehicle 90 across the ground. In various embodiments, each drive wheel 92a-92b may include a tire mounted on a rim. The drive wheels 92a-92b may be used to provide traction between the vehicle 90 and the ground upon which the vehicle 90 is sitting.

The propulsion control system 100 is operational to provide an open-loop control of torque and power to meet vehicle propulsion dynamics and constraints. The propulsion control system 100 is configured to protect the propulsion hardware (e.g., the energy storage device 110, the electric motor 104, half-shafts, clutches, gear boxes, a transmission, drive shafts, etc.). The open-loop control also provides fast propulsion response (e.g., about a 12.5 millisecond delay to about a 6.25 millisecond delay) to dynamic actuator torque events.

The motor controller 102 implements an electric drive control circuit (or device). The motor controller 102 is coupled to the electric motor 104, the supervisory controller 108 and the energy storage device 110. The motor controller 102 is configured to generate a final torque command in response to an intermediate torque command and a distributed power limit command. The final torque command is presented to the electric motor 104. The intermediate torque command and the distributed power limit command are received by the motor controller 102 from the supervisory controller 108. The motor controller 102 may be implemented in hardware and/or software executing on the hardware.

The electric motor 104 implements either permanent magnet electric motor or an induction motor (or machine). The electric motor 104 is generally operational to generate an axle torque in response to the final torque command received from the motor controller 102. The axle torque is transferrable to the drive wheels 92a-92b through the hardware devices 106. A motor constraint of the electric motor 104 specifies a maximum torque for proper operation of the electric motor 104. Other types of electric motors may be implemented to meet a design criteria of a particular application.

The hardware devices 106 implements a gear box or a transmission, and multiple drive-train components. The hardware devices 106 are generally operational to transfer the axle torque from the electric motor 104 to the drive wheels 92a-92b of the vehicle 90. The hardware devices 106 may have respective hardware device constraints that define operating limits in which the hardware devices 106 are not damaged.

The supervisory controller 108 implements one or more processors that control the propulsion control system 100. The supervisory controller 108 is coupled to the energy storage device 110 and the motor controller 102. The supervisory controller 108 implements an open-loop control function configured to calculate an initial torque command vector in response to a driver torque command, calculate an intended operating vector in a multidimensional power space by a polynomial mapping of the initial torque command vector into the multidimensional power space, and prioritize the motor constraints, the hardware device constraints, and the energy storage constraints. The open-loop control function also generates the intermediate torque command by clipping the intended operating vector in response to the prioritized motor constraint, generates a constrained command vector by clipping the intended operating vector in response to the motor constraint, the hardware device constraints, and energy storage constraints as prioritized, and generate the distributed power limit command in response to the constrained command vector. The clipping generally protects the electric motor 104, the hardware devices 106, and the energy storage device 110 from damage due to the driver torque command. One or more of the device constraints may be a second-order nonlinear constraint. One or more of the device constraints may be a linear constraint. Higher orders of constraints may be implemented in various embodiments to meet the design criteria of a particular application.

The energy storage device 110 implements a rechargeable energy storage system. The energy storage device 110 is generally operational to store energy used by the electric motor 104. In various embodiments, the energy storage device 110 may implement one or more sets of batteries and/or battery packs. In other embodiments, the energy storage device 110 may implement one or more fuel cells, gas-powered generators, natural gas generators, and the like. The energy storage device(s) 110 may include corresponding energy storage controller(s). In a charging mode, the energy storage device 110 may receive electrical current from a generator and/or external source. In a discharging mode, the energy storage device 110 may provide electrical current to the electric motor 104. The energy storage device 110 may include multiple energy storage modules electrically connected in series and/or in parallel between a positive energy storage device terminal and a negative energy storage device terminal. In various embodiments, the energy storage device 110 may provide approximately 200 to 1,000 volts DC (direct current) electrical potential between the positive energy storage device terminal and the negative energy storage device terminal. Other energy storage voltages may be implemented to meet the design criteria of a particular application.

Figure 2:
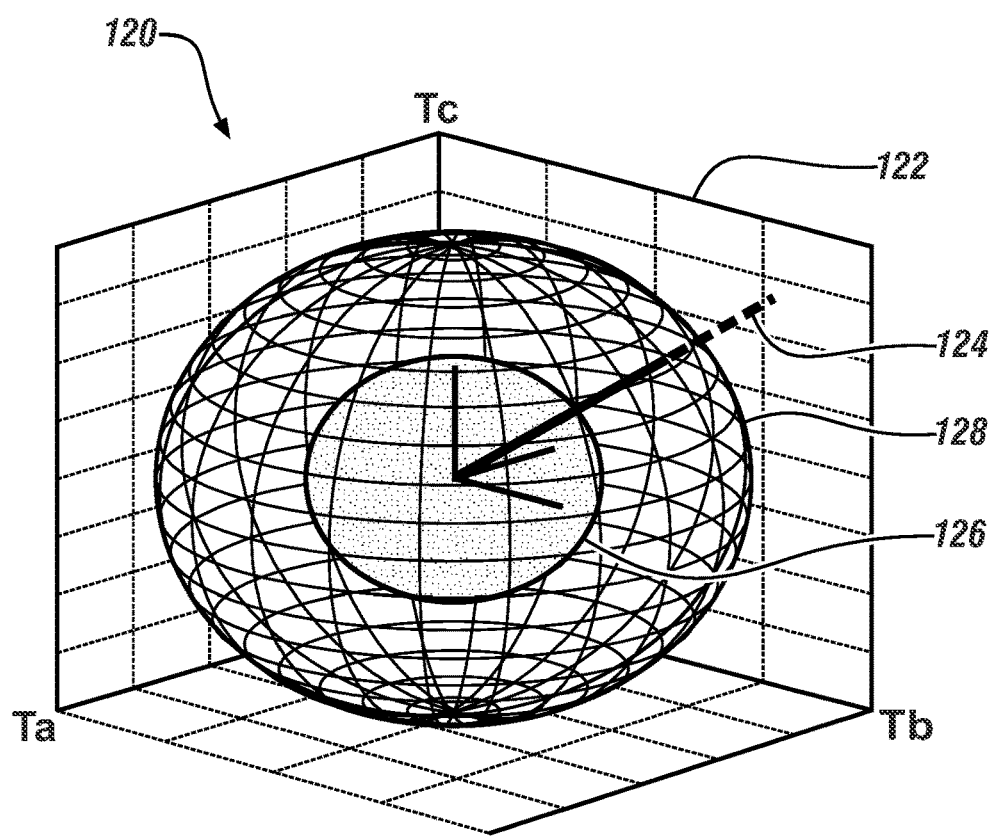
FIG. 2 is a schematic three-dimensional diagram of a multidimensional power space in accordance with one or more exemplary embodiments.

Referring to FIG. 2, a schematic three-dimensional diagram of an example implementation of multidimensional power space 120 is shown in accordance with one or more exemplary embodiments. The multidimensional power space (or vector space) 120 may be described in terms of a Cartesian coordinate system 122 having a first axis Ta, a second axis Tb, and a third axis Tc. An example of an intended operating vector 124 is shown. The intended operating vector 124 in the example passes from an origin of the Cartesian coordinate system 122 out through a minimum sphere 126 and a maximum sphere 128. The minimum sphere 126 generally establishes a minimum size limitation of the intended operating vector 124. For example, the minimum sphere 126 may represent a minimum motor limit while the propulsion control system 100 is used in a regenerative breaking mode. The maximum sphere 128 may establish a maximum size limitation of the intended operating vector 124. For example, the maximum sphere 128 may establish a maximum energy storage power limit while propulsion control system 100 is used in a propulsion mode. Other spheres and/or surfaces for various constraints may be implemented to meet the design criteria of a particular application.

Figure 3:
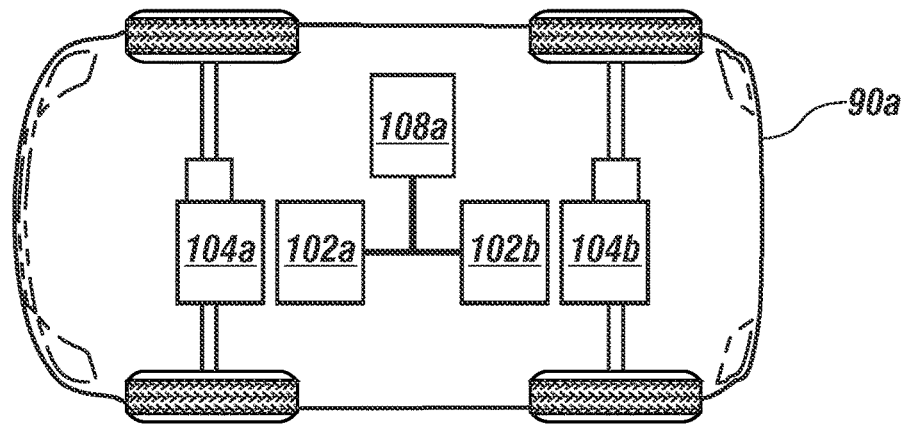
FIG. 3 is a schematic plan diagram of a two-motor vehicle in accordance with one or more exemplary embodiments.

Referring to FIG. 3, a schematic plan diagram of an example implementation of a two-motor vehicle 90a is shown in accordance with one or more exemplary embodiments. The two-motor vehicle 90a may be a variation of the vehicle 90. The two-motor vehicle 90a includes two motor controllers 102a-102b, two electric motors 104a-104b, and a supervisory controller 108a. Each motor controller 102a-

102*b* may be a copy of the motor controller 102. Each electric motor 104*a*-104*b* may be a copy of the electric motor 104. The supervisory controller 108*a* may be a variation of the supervisory controller 108. The supervisory controller 108*a* is configured to allocate the available power and the constrained torque among the two electric motors 104*a*-104*b*.

Figure 4:
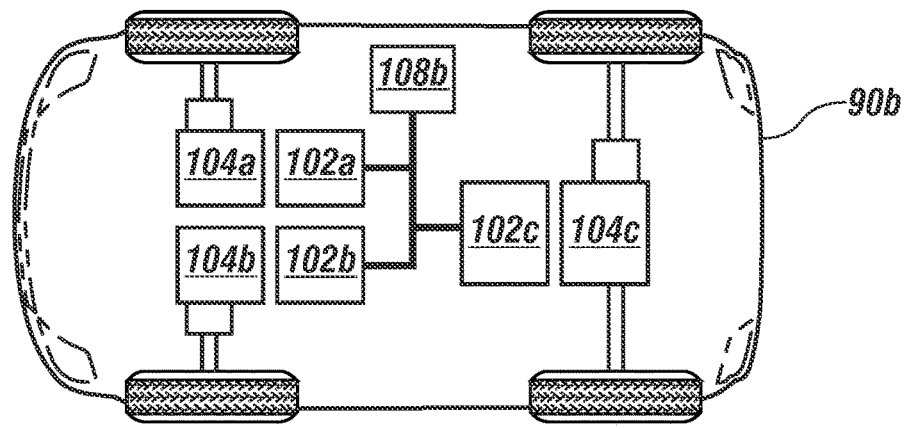
FIG. 4 is a schematic plan diagram of a three-motor vehicle in accordance with one or more exemplary embodiments.

Referring to FIG. 4, a schematic plan diagram of an example implementation of a three-motor vehicle 90*b* is shown in accordance with one or more exemplary embodiments. The three-motor vehicle 90*b* may be a variation of the vehicle 90. The three-motor vehicle 90*b* includes three motor controllers 102*a*-102*c*, three electric motors 104*a*-104*c*, and a supervisory controller 108*b*. Each motor controller 102*a*-102*c* may be a copy of the motor controller 102. Each electric motor 104*a*-104*c* may be a copy of the electric motor 104. The supervisory controller 108*b* may be a variation of the supervisory controller 108. The supervisory controller 108*b* is configured to allocate the available power and the constrained torque among the three electric motors 104*a*-104*c*.

Figure 5:
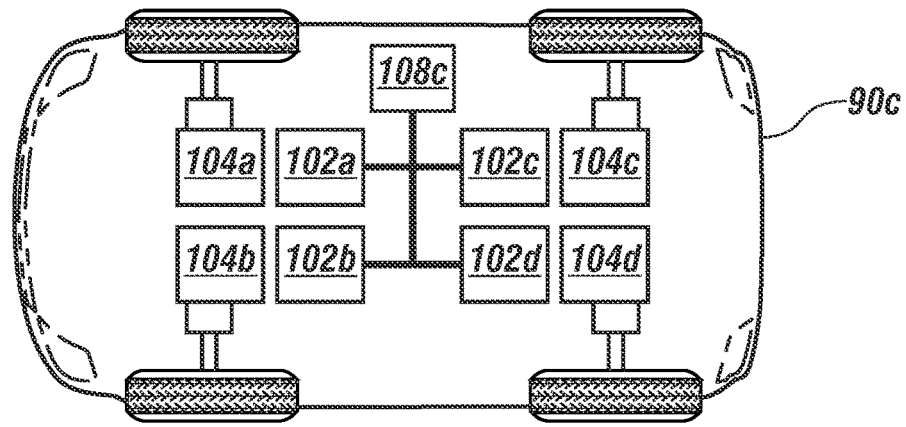
FIG. 5 is a schematic plan diagram of a four-motor vehicle in accordance with one or more exemplary embodiments.

Referring to FIG. 5, a schematic plan diagram of an example implementation of a four-motor vehicle 90*c* is shown in accordance with one or more exemplary embodiments. The four-motor vehicle 90*c* may be a variation of the vehicle 90. The four-motor vehicle 90*c* includes four motor controllers 102*a*-102*d*, four electric motors 104*a*-104*d*, and a supervisory controller 108*c*. Each motor controller 102*a*-102*d* may be a copy of the motor controller 102. Each electric motor 104*a*-104*d* may be a copy of the electric motor 104. The supervisory controller 108*c* may be a variation of the supervisory controller 108. The supervisory controller 108*c* is configured to allocate the available power and the constrained torque among the four electric motors 104*a*-104*d*.

In various embodiments, other numbers of electric motors 104 may be implemented to meet the design criteria of a particular application. For example, the vehicle 90 may include a range of electric motors 104 from a single electric motor 104 to up to ten electric motors 104. In some embodiments, the vehicle 90 may include multiple (e.g., two or three) electric motors 104 per axle (e.g., eight electric motors 104 total).

Figure 6:
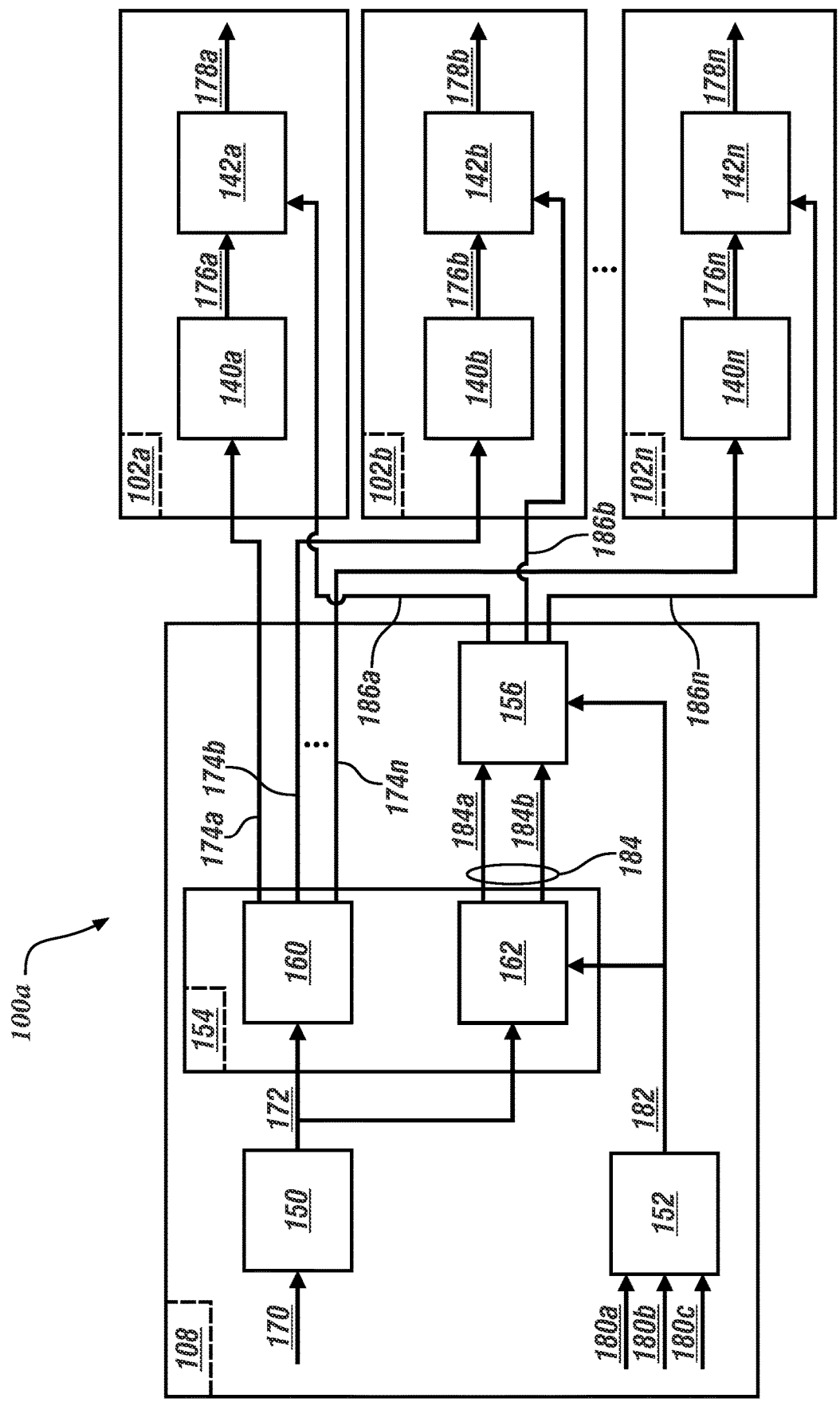
FIG. 6 is a schematic diagram of a portion of a propulsion control system in accordance with one or more exemplary embodiments.

Referring to FIG. 6, a schematic diagram of an example implementation of a portion of a propulsion control system 100*a* is shown in accordance with one or more exemplary embodiments. The propulsion control system 100*a* may be a variation of the propulsion control system 100 with multiple motors. The motor controllers 102*a*-102*n* may include fast actuator control modules 140*a*-140*n* and single motor constrain modules 142*a*-142*n*, respectively. The supervisory controller 108 may include a vehicle motion controller module 150, a voltage and current control system module 152, a vector clipping module 154, and a power distribution module 156. The vector clipping module 154 may include a motor torque constraint module 160, and a motor and power constraints module 162. The supervisory controller 108 is operational to perform an open-loop control function to provide commands to the motor controllers 102*a*-102*n*.

A driver torque command 170 is received by the vehicle motion controller module 150. The vehicle motion controller module 150 is operational to convert the driver torque command 170 into an intended operating vector 172. The motor torque constraint module 160 is operational to generate multiple intermediate torque commands 174*a*-174*n* by clipping the intended operating vector 172 in response to the motor constraints of the electric motors 104*a*-104*n*. The clipping generally prevents the motor controllers 102*a*-102*n* from damaging the electric motors 104*a*-104*n* due to large amplitudes of the intended operating vector 172. The fast actuator control modules 140*a*-140*n* are operational to perform active damping, lash, and wheel-flare mitigation operations on the intermediate torque commands 174*a*-174*n* to generate internal commands 176*a*-176*n*, respectively. The single motor constrain modules 142*a*-142*n*, are operational to generate the motor torque commands 178*a*-178*n* by constraining the the internal commands 176*a*-176*n* based on the distributed power commands 186*a*-186*n*.

Energy storage limits (e.g., energy storage power limits, energy storage voltage limits, and energy storage current limits) 180*a*-180*c* are received by the voltage and current control system module 152. The voltage and current control system module 152 is operational to generate total power limits 182 (e.g., a maximum value and a minimum value) in response to the energy storage limits 180*a*-180*c*. In various embodiments, the control system module 152 may operate closed loop internal to itself. The motor and power constraints module 162 uses the total power limits 182 and the intended operating vector 172 to generate constrained command vectors 184. The constrained command vectors 184 includes a constrained axle command vector 184*a* and a constrained command power vector 184*b*. The power distribution module 156 received the constrained command vectors 184 and the total power limits 182. The power distribution module 156 is operational to generate the distributed power commands 186*a*-186*n* (e.g., maximum values and minimum values) in response to the constrained command vectors 184 and the total power limits 182.

The driver torque command 170 is consumed by the open-loop control function as an initial unconstrainted open-loop torque vector. Initial values in the driver torque command 170 determine the intended operating vector 124 (FIG. 2) that the propulsion control system 100 is attempting to achieve. The intended operating vector 124 may be represented as a one-dimensional, N-element array. The various device constraints (e.g., the motor constraints, the energy storage constrains, the hardware device constraints, etc.) may be prioritized. The constraints that are evaluated first are the least important constraints compared to the last constraints to be evaluated. The last constraints are the most important constraints (e.g., constraints of an expensive motor). Some of the constrains may be linear constraints. Other constrains may be second-order nonlinear constraints (e.g., the energy storage power limits). Higher orders of constraints may be implemented in various embodiments to meet the design criteria of a particular application.

Figure 7:
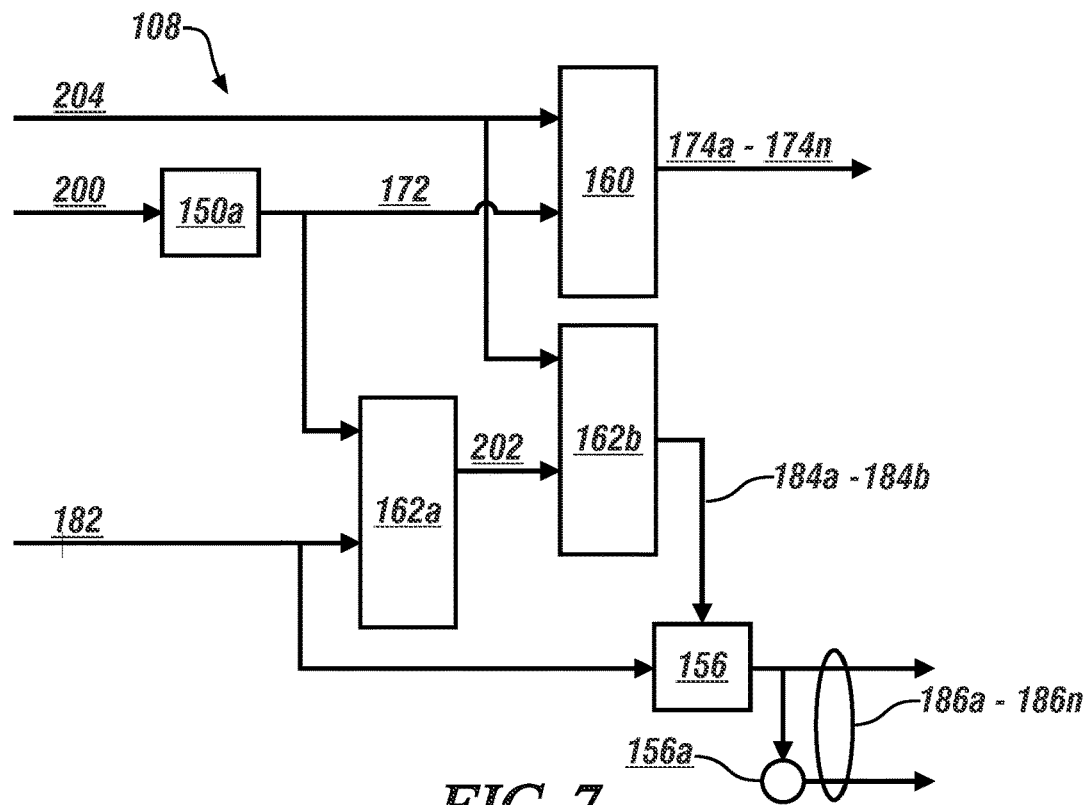
FIG. 7 is a schematic detailed diagram of an open-loop control function in a supervisory controller in accordance with one or more exemplary embodiments.

Referring to FIG. 7, a schematic detailed diagram of an example implementation of the open-loop control function in the supervisory controller 108 is shown in accordance with one or more exemplary embodiments. An initial operating vector 200 is used to determine what power may be consumed to produce the requested axle torque. The energy storage power limits 180*a*-180*c* are converted to an Tx,Ty,Tz torque space. The one-dimensional initial operating vector 200 is converted to the intended operating vector 172 in the Tx,Ty,Tz torque space by motor torque module 150*a* using the A,B,C power coefficients that allow the constraints and the vector to be compared and a new calculated constrained vector is determined. If a power conveyed by the intended operating vector 172 is within the constraints, the torque values are passed through to the linear constraints.

The power limits 182 (e.g., an energy storage power minimum value, an energy storage power maximum value, motor characterization values A1, A2, B1, B2, C1, C2, Ca, Cb, Cc, and Accessory Power) are received by an energy storage clipping module 162a (part of the motor and power constraints module 162). The energy storage clipping module 162a generates an internal energy storage vector 202 containing torque values that are clipped by the energy storage power based on the power limits 182 and the intended operating vector 172. The internal energy storage vector 202 is presented to a motor clipping module 162b (part of the motor and power constraints module 162) for subsequent clipping based on the motor limits. The motor clipping module 162b is operational to generate the constrained command vectors (e.g., TaMtrBattFinal, TbMtrBattFinal, TcMtrBattFinal) in response to the internal energy storage vector 202 and the motor constraints 204 (e.g., motor A/B/C minimum limits and maximum limits).

The linear constraints are applied, one by one, in the motor torque constraint module 160 and the motor clipping module 162b until either every constraint is applied, or the value being considered is already within the constraints. The motor torque constraint module 160 is operational to generate the intermediate torque commands 174a-174n (e.g., TaMtrFinal, TbMtrFinal, TcMtrFinal) in response to the motor constraints 204 and the intended operating vector 172.

Each element of the initial torque array is indexed and compared to a respective motor limit. If the element of the initial vector array is beyond the value of the given motor limit, the torque element is constrained (or clipped) and the other elements of the array are recalculated to maintain the initial vector direction provided by the initial operating vector 200. The distributed power commands 186a-186n (e.g., Pa, Pb, Pc, . . . , Pn) are generated by the power distribution module 156 in response to the constrained command vectors 184a-184b and a portion of the energy storage constraints (e.g., A1, A2, B1, B2, C1, C2, Ca, Cb, and Cc). A power value is calculated by a summation module 156a to determine a final power (e.g., Ptotal) for the electric motors 104a-104n based on the final constrained values.

Figure 8:
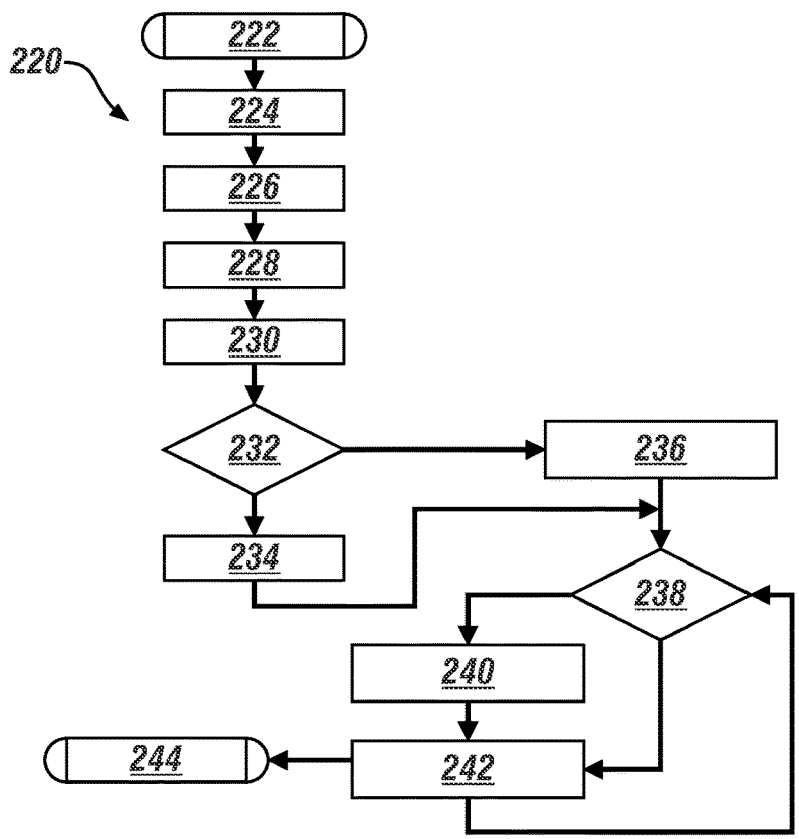
FIG. 8 is a top-level flow diagram of the open-loop control function in accordance with one or more exemplary embodiments.

Referring to FIG. 8, a top-level flow diagram of an example implementation of the open-loop control function 220 is shown in accordance with one or more exemplary embodiments. The method (or process) 220 may be performed by the propulsion control system 100. The method 220 includes a step 222, a step 224, a step 226, a step 228, a step 230, a step 232, a step 234, a step 236, a step 238, a step 240, a step 242, and a step 244. The sequence of steps is shown as a representative example. Other step orders may be implemented to meet the criteria of a particular application.

In the step 222, an initial open-loop desired propulsion torque vector may be received by the supervisory controller 108. Energy storage power limits from the shared power source (e.g., the energy storage device 110) may be obtained in the step 224. Motor limits for each individual motor (or actuator) may be retrieved in the step 226. In the step 228, the initial linear vector space may be converted to a nonlinear vector space. A desired optimal point within the nonlinear constraint limits is calculated in the step 230. In the step 232, a determination is made if the desired vector falls within maximum and minimum nonlinear limits. If the desired vector falls within the maximum and minimum nonlinear limits, the initial vector is passed through in the step 234. If not, a new point that falls within the nonlinear constraints that minimizes a deviation from the original vector is calculated in the step 236.

In the step 238, a determine is made if the desired vector (passed through from the step 234 or updated in the step 236) falls within each individual linear limit. If not, a new point that falls within the linear constraint that minimized a deviation from the original vector is calculated in the step 240. If the desired vector does fall within each individual linear limit per the step 238 or has been updated in the step 240, the desired vector becomes a final vector that meets the linear constrains in the step 242. If one or more constraints remain available for consideration, the method 220 may return to the step 238 and further determinations may be performed. In the step 244, the final vector that is within the linear constraints and the nonlinear constraints is presented as the final power for the electric motors 104a-104n. In various embodiments, the linear constraints may be considered before the non-linear constraints.

Figure 9:
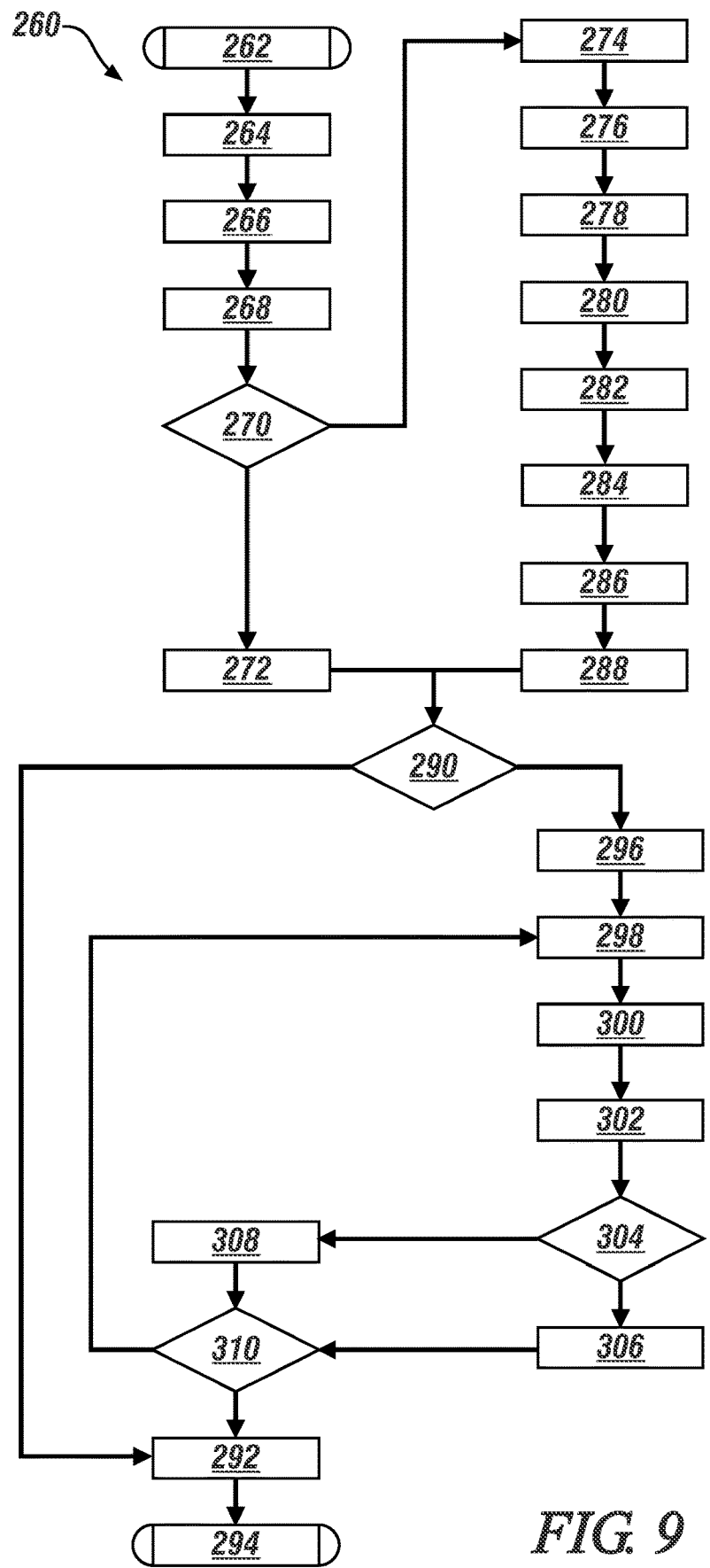
FIG. 9 is a detailed flow diagram of the open-loop control function in accordance with one or more exemplary embodiments.

Referring to FIG. 9, a detailed flow diagram of an example implementation of the open-loop control function 260 is shown in accordance with one or more exemplary embodiments. The method (or process) 260 may be performed by the propulsion control system 100. The method 260 includes a step 262, a step 264, a step 266, a step 268, a step 270, a step 272, a step 274, a step 276, a step 278, a step 280, a step 282, a step 284, a step 286, a step 288, a step 290, a step 292, a step 294, a step 296, a step 298, a step 300, a step 302, a step 304, a step 306, a step 308, and a step 310. The sequence of steps is shown as a representative example. Other step orders may be implemented to meet the criteria of a particular application.

In the step 262, a 1×N element array may be created. In the example, three electric motors 104a-104c are considered and so the 1×N element array is a 1×3 element array. The elements represent torque actuators, maximum/minimum nonlinear (e.g., energy storage device power) limits, and maximum/minimum (e.g., torque) linear limits of each electric motor 104a-104c. In the step 264, pull in the A, B, C power coefficients based on the torques and the rotational speeds of the motors 104a-104c. An initial Tx, Ty, Tz coordinate plan is set up in the step 266 for power comparisons. In the step 268, the power appropriate to meet the desire torque is calculated using equations 1 and 2 as follows:

$$\text{Power} = (A1 + Ta \times A2)^2 + (B1 + Tb \times B2)^2 + (C1 + Tc \times C2)^2 + C\_Sum \quad (1)$$

$$C\_Sum = Ca + Cb + Cc + \text{Accessory Power} \quad (2)$$

In the step 270, a check is made to see if the calculated power falls within the energy storage power maximum/minimum limits. If the calculated power does fall within the limits, the initial 1×3 torque vector array is passed through unchanged. The initial 1×3 torque value array is subsequently passed through in the step 272 to the step 290.

If the calculated power does not fall within the limits per the step 270, values for a, b and c are calculated in the step 274 using equations 3, 4, and 5 as follows:

$$a = (Tx2 - Tx1)^2 + (Ty2 - Ty1)^2 + (Tz2 - Tz1)^2 \quad (3)$$

$$b = -2 \times ((Tx2 - Tx1) \times (Xc - Tx1) + (Ty2 - Ty1) \times (Yc - Ty1) + (Tz2 - Tz1) \times (Zc - Tz1)) \quad (4)$$

$$c = (Xc - Tx1)^2 + (Yc - Ty1)^2 + (Zc - Tz1)^2 - (\text{Energy storage Max/Min Limit} - C\_Sum) \quad (5)$$

Tx1, Ty1, Tz1 identifies the zero torque converted to the Tx, Ty, Tz coordinate system. Tx2, Ty2, Tz2 identifies the intended operating vector 172 converted into the Tx, Ty, Tz coordinate system. Xc, Yc, Zc identifies the origin point in the Tx, Ty, Tz coordinate system.

A solution check is performed in the step 276 using equation 6 to verify that there is an intersection between the three-dimensional vector and the energy storage power sphere as follows:

$$\text{SolutionCheck} = b^2 - 4ac \qquad (6)$$

If the value of SolutionCheck is positive, an intersection exists. If the value of SolutionCheck is negative, no intersection exists. If no intersection exists, nonlinear constraints do not get applied. In the step 278, negative and positive roots of the intersection are calculated per equations 7 and 8 as follows:

$$\text{PosRoot} = (-b + \text{sqrt}(b^2 - 4ac))/(2a) \qquad (7)$$

$$\text{NegRoot} = (-b - \text{sqrt}(b^2 - 4ac))/(2a) \qquad (8)$$

In the step 280, a new clipping point of the one-dimensional vector is calculated using equations 9 through 14 as follows:

$$X1\_\text{PosRoot} = Tx1 + Tx2 - Tx1 \times \text{PosRoot} \qquad (9)$$

$$Y1\_\text{PosRoot} = Ty1 + Ty2 - Ty1 \times \text{PosRoot} \qquad (10)$$

$$Z1\_\text{PosRoot} = Tz1 + Tz2 - Tz1 \times \text{PosRoot} \qquad (11)$$

$$X1\_\text{NegRoot} = Tx1 + Tx2 - Tx1 \times \text{NegRoot} \qquad (12)$$

$$Y1\_\text{NegRoot} = Ty1 + Ty2 - Ty1 \times \text{NegRoot} \qquad (13)$$

$$Z1\_\text{NegRoot} = Tz1 + Tz2 - Tz1 \times \text{NegRoot} \qquad (14)$$

The vector is converted back to Ta, Tb, Tc coordinate system in the step 282 using equations 15 through 20 as follows:

$$Ta\_\text{PosRoot} = (X1\_\text{PosRoot} - A2)/(A1) \qquad (15)$$

$$Tb\_\text{PosRoot} = (Y1\_\text{PosRoot} - B2)/(B1) \qquad (16)$$

$$Tc\_\text{PosRoot} = (Z1\_\text{PosRoot} - C2)/(C1) \qquad (17)$$

$$Ta\_\text{NegRoot} = (X1\_\text{NegRoot} - A2)/(A1) \qquad (18)$$

$$Tb\_\text{NegRoot} = (Y1\_\text{NegRoot} - B2)/(B1) \qquad (19)$$

$$Tc\_\text{NegRoot} = (Z1\_\text{NegRoot} - C2)/(C1) \qquad (20)$$

In the step 284, the method 260 determines which root is the correct torque based on the distances of the two roots from the center of the Tx, Ty, Tz coordinate system. The distances are determined by equations 21 and 22 as follows:

$$\text{DistanceToPosRoot} = \text{sqrt}(((X1\_\text{PosRoot} - Tx2)^2 + (Y1\_\text{PosRoot} - Ty2)^2 + (Z1\_\text{PosRoot} - Tz2)^2) \qquad (21)$$

$$\text{DistanceToNegRoot} = \text{sqrt}(((X1\_\text{NegRoot} - Tx2)^2 + (Y1\_\text{NetRoot} - Ty2)^2 + (Z1\_\text{NetRoot} - Tz2)^2) \qquad (22)$$

Per the step 286, if the DistanceToPosRoot is less than the DistanceToNegRoot, the values of the positive root Ta, Tb, Tc are used. If the DistanceToPosRoot is greater than the DistanceToNegRoot, the values of the negative root Ta, Tb, Tc are used. The new 1×3 nonlinear clipped torque vector array is passed on by the step 288 to the step 290.

In the step 290, a determination is made if the elements in the desired one-dimensional torque vector falls within each individual linear limit. If true, the method continues with the step 292. In the step 292, the power appropriate to meet the one-dimensional torque vector is calculated. In the step 294, the method 260 concludes that the final one-dimensional torque vector falls within the nonlinear (e.g., energy storage device) limits and the linear (e.g., electric motor) limits. Therefore, the one-dimensional power values and the torque values are provided to the other components.

If the step 290 determines that one or more of the elements in the desired one-dimensional torque vector falls outside one or more individual linear limits, the method 260 continues with the step 296. In the step 296, a determination is made of which linear limits are being violated. The violations are stored as Boolean values in a one-dimensional array. The one-dimensional Boolean array is stored in the step 298 for later comparisons.

In the step 300, similar triangle calculations are used to determine the other linear values in equations 23, 24, and 25. In the example with three motors (e.g., Motor A, Motor B, and Motor C), the torque limits of the Motor B may provide the limiting factor as follows:

$$\text{MotorA\_Clipped\_Torque} = \text{MotorB\_Torque\_Limit} \times \text{Initial MotorA Torque/Initial MotorB Torque} \qquad (23)$$

$$\text{MotorB\_Clipped\_Torque} = \text{MotorB\_Torque\_Limit} \qquad (24)$$

$$\text{MotorC\_Clipped\_Torque} = \text{MotorB\_Torque\_Limit} \times \text{Initial MotorC Torque/Initial MotorB Torque} \qquad (25)$$

In the step 302, the new one-dimensional clipped torque vector for the electric motor N is compared with the one-dimensional vector that was stored (step 298) before the motor clipping calculations. If the new vector has a lower magnitude than the old vector per the comparison in the step 304, the new one-dimensional clipped vector is used for the electric motor N in the step 306. If the old vector has a lower magnitude than the new vector per the comparison in the step 304, the stored old vector is used for the motor N in the step 308. After using one of the old or new vectors, the method 260 continues with the step 310 to check if the evaluations of the motor torque limits have completed. If not, the method returns to the step 298 and evaluates the next motor torque limit. Once the evaluations have been complete per the step 310, the method continues to the step 292 to calculate the power appropriate to meet the 1×3 torque vector. The method 260 concludes in the step 294 that the final 1×3 torque vector falls within the nonlinear (e.g., energy storage device) limits and the linear (e.g., electric motor) limits. Therefore, the two arrays, 1×3 for power command values 186a-186n and 1×3 for torque command values 174a-174n, are provided to the other components.

Figure 10:
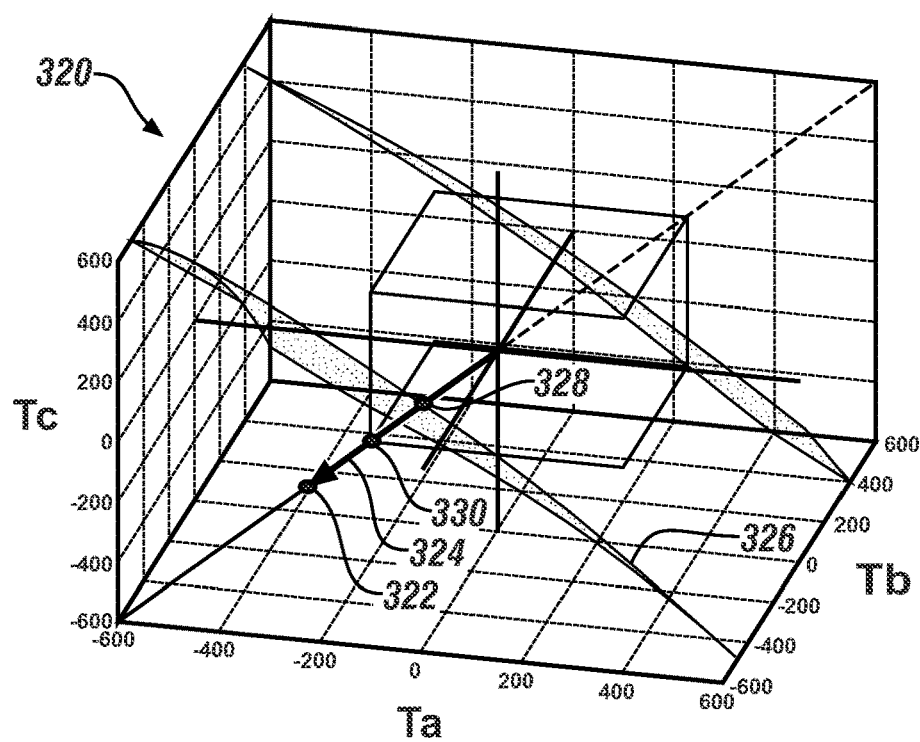
FIG. 10 is a schematic three-dimensional diagram of a braking regeneration test case in accordance with one or more exemplary embodiments.

Referring to FIG. 10, a schematic three-dimensional diagram 320 of an example braking regeneration test case is shown in accordance with one or more exemplary embodiments. In the regeneration test case, a starting point 322 for an initial desired vector 324 is determined. The initial desired vector 324 may first be checked against motor constraints 326 and subsequently clipped by a minimum motor limit at a point 328. If the initial desired vector 324 is compliant with the motor constraints 326, a second check may be performed for power constraints. The initial desired vector 324 may be subsequently clipped at a point 330 by an energy storage minimum power limit. If not, additional constraints may be considered until every constrain has been checked.

Figure 11:
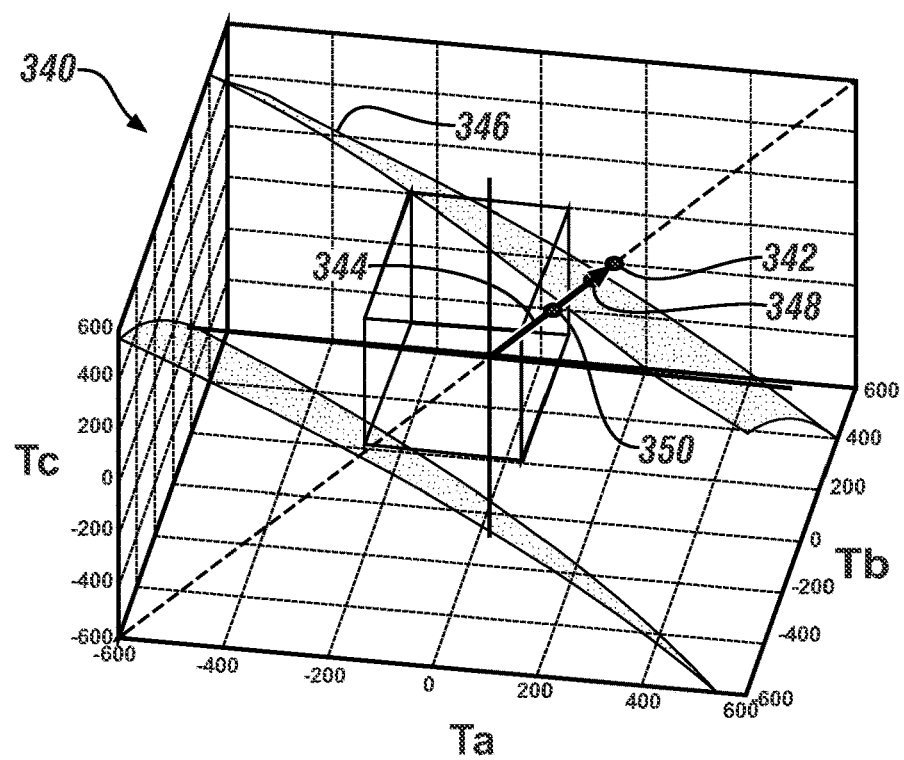
FIG. 11 is a schematic three-dimensional diagram of a propulsion test case in accordance with one or more exemplary embodiments.

Referring to FIG. 11, a schematic three-dimensional diagram 340 of an example propulsion test case is shown in accordance with one or more exemplary embodiments. In the propulsion test case, a starting point 342 for an initial desired vector 344 is determined. The initial desired vector 344 may first be checked against energy storage constraints 346 and subsequently clipped by a minimum motor limit at a point 348. If the initial desired vector 344 is compliant with the energy storage constraints 346, a second check may be performed for the motor constraints. The initial desired vector 344 may be subsequently clipped at a point 350 by a maximum motor limit. If not, additional constraints may be considered until every constrain has been checked.

The propulsion control technique generally utilizes analytical geometry to apply second-order nonlinear constraints to an initial vector. The technique uses an intersection of an N-dimensional vector with an N-dimensional sphere to relate actuator to nonlinear limits. Similar triangles or trigonometric functions are used in an N-dimensional space to apply linear constraints. The technique is flexible since the constraints may be prioritized based on application criteria. The technique is also expandable to N actuators and M constraints. A reduced computational throughput in the controller may be realized when actuator commands are zero or actuators are switched off. For example, if one actuator is switched off, the problem is solved in an (N-1)th-dimensional space and so utilizes less computational resources. Furthermore, a conversion of torque and power command vectors into an N-dimensional geometric vector space in the technique ensures that hardware constraints are adhered.

The constraint priority is adjustable based on the implementation of the propulsion system. The technique provides a high speed and minimal computational throughput designs that maintain vehicle dynamic torque vector while meeting hardware limits. An optimal point and a given driver-requested vector are generally honored. The optimal point may be an N-dimensional vector of a desired point. A range of the number of actuators may be from 1 to N actuators. The calculations may output final value as two arrays, one array for torque and the other array for power appropriate to meet the desired torque. The technique provides a three-dimensional spherical space that may be debugged and easily visualized to determine if the results are within the provided constraints and final values is an optimal least violated value.

Numerical values of parameters (e.g., of quantities or conditions) in this specification, including the appended claims, are to be understood as being modified in each instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of values and further divided ranges within the entire range. Each value within a range and the endpoints of a range are hereby disclosed as separate embodiments.

While the best modes for carrying out the disclosure have been described in detail, those familiar with the art to which this disclosure relates will recognize various alternative designs and embodiments for practicing the disclosure within the scope of the appended claims.

What is claimed is:

1. A propulsion control system comprising:
    an electric motor configured to generate an axle torque in response to a final torque command, wherein the axle torque is transferrable to a drive wheel, and the electric motor has a motor constraint that specifies a maximum torque for proper operation of the electric motor;
    a motor controller coupled to the electric motor, and configured to generate the final torque command in response to an intermediate torque command and a distributed power limit command; and
    a supervisory controller coupled to the motor controller, wherein the supervisory controller has an open-loop control function configured to:
        calculate an initial torque command vector in response to a driver torque command;
        calculate an intended operating vector in a multidimensional power space by a polynomial mapping of the initial torque command vector into the multidimensional power space;
        generate the intermediate torque command by clipping the intended operating vector in response to the motor constraint;
        generate a constrained command vector by clipping the intended operating vector in response to the motor constraint and a plurality of energy storage constraints; and
        generate the distributed power limit command in response to the constrained command vector.

2. The propulsion control system according to claim 1, further comprising an energy storage device configured to provide electrical power to the motor controller, wherein the energy storage device has the plurality of energy storage constraints that specifies a plurality of electrical limits for proper operation of the energy storage device.

3. The propulsion control system according to claim 2, wherein the clipping protects a plurality of propulsion hardware devices from damage due to the driver torque command, the propulsion hardware devices have a plurality of device constraints, and the plurality of device constraints includes the motor constraint and the plurality of energy storage constraints.

4. The propulsion control system according to claim 3, wherein one or more of the plurality of device constraints is a nonlinear constraint.

5. The propulsion control system according to claim 4, wherein one or more of the plurality of device constraints is a linear constraint.

6. The propulsion control system according to claim 3, wherein the supervisory controller is configured to prioritize the plurality of device constraints.

7. The propulsion control system according to claim 6, wherein a lowest priority device constraint is considered first in the open-loop control function, and a highest priority device constraint is considered last in the open-loop control function.

8. The propulsion control system according to claim 2, wherein the supervisory controller is configured to generate the multidimensional power space as a three-dimensional power space based on a plurality of limitations of the energy storage device.

9. The propulsion control system according to claim 1, wherein the electric motor, the motor controller, and the supervisory controller form part of a vehicle.

10. A method for controlling propulsion in a vehicle comprising:
    calculating an initial torque command vector with a supervisory controller using an open-loop control function in response to a driver torque command;
    calculating an intended operating vector in a multidimensional power space by a polynomial mapping of the initial torque command vector into the multidimensional power space;

generating an intermediate torque command by clipping the intended operating vector in response to a motor constraint, wherein the motor constraint specifies a maximum torque for proper operation of an electric motor;

generating a constrained command vector by clipping the intended operating vector in response to the motor constraint and a plurality of energy storage constraints, wherein the plurality of energy storage constraints specifies a plurality of electrical limits for proper operation of an energy storage device;

generate a distributed power limit command in response to the constrained command vector;

generating a final torque command with a motor controller in response to the intermediate torque command and the distributed power limit command; and generating an axle torque with the electric motor in response to the final torque command, wherein the axle torque is transferrable to a drive wheel of the vehicle.

11. The method according to claim 10, wherein the clipping protects a plurality of propulsion hardware devices from damage due to the driver torque command, the propulsion hardware devices have a plurality of device constraints, and the plurality of device constraints includes the motor constraint and the plurality of energy storage constraints.

12. The method according to claim 11, wherein one or more of the plurality of device constraints is a nonlinear constraint.

13. The method according to claim 12, further comprising:
prioritizing the plurality of device constraints.

14. The method according to claim 13, wherein a lowest priority device constraint is considered first in calculating the open-loop control function, and a highest priority device constraint is considered last in the open-loop control function.

15. The method according to claim 10, further comprising:
generating the multidimensional power space as a three-dimensional power space based on a plurality of limitations of the energy storage device.

16. The method according to claim 10, further comprising:
adjusting the intermediate torque command in response to the intermediate torque command exceeding the motor constraint, wherein the adjustment causes the electric motor to operate within the motor constraint.

17. A propulsion control system comprising:
a plurality of electric motors configured to generate a plurality of axle torques in response to a plurality of final torque commands, wherein the plurality of axle torques is transferrable to a plurality of drive wheels, each of the plurality of electric motors has a motor constraint that specifies a maximum torque for proper operation of a corresponding one of the plurality of electric motors;

a plurality of motor controllers coupled to the plurality of electric motors, and configured to generate the plurality of final torque commands in response to a plurality of intermediate torque commands and a plurality of distributed power limit commands;

an energy storage device configured to provide electrical power to the plurality of motor controllers, wherein the energy storage device has a plurality of energy storage constraints that specifies a plurality of electrical limits for proper operation of the energy storage device; and a supervisory controller coupled to the energy storage device and the plurality of motor controllers, wherein the supervisory controller has an open-loop control function configured to:
calculate an initial torque command vector in response to a driver torque command;
calculate an intended operating vector in a multidimensional power space by a polynomial mapping of the initial torque command vector into the multidimensional power space;
prioritize the plurality of motor constraints and the plurality of energy storage constraints;
generate a plurality of the intermediate torque commands by clipping the intended operating vector in response to the plurality of motor constraints as prioritized;
generate a plurality of constrained command vectors by clipping the intended operating vector in response to the plurality of motor constraints and a plurality of energy storage constraints as prioritized; and
generate the plurality of distributed power limit commands in response to the constrained command vector.

18. The propulsion control system according to claim 17, wherein the supervisory controller is configured to adjust the plurality of intermediate torque commands in response to a particular one of the plurality of intermediate torque commands for a particular one of the plurality of motors exceeding a corresponding one of the plurality of motor constraints, and the adjustment causes the particular electric motor to operate within the corresponding motor constraint.

19. The propulsion control system according to claim 17, wherein a computational throughput of the supervisory controller reduces in response to one or more of the plurality of electric motors being commanded to generate zero torque or one or more of the plurality of motor controllers being switched off.

20. The propulsion control system according to claim 17, wherein the plurality of electric motors is implemented in a vehicle, and ranges from two electric motors to eight electric motors.

* * * * *